(12) United States Patent
Foreman

(10) Patent No.: US 6,637,258 B1
(45) Date of Patent: Oct. 28, 2003

(54) LEAK DETECTOR APPARATUS AND METHOD

(76) Inventor: Wilson Foreman, 145 Sundance Trail, Austin, TX (US) 78642

( * ) Notice: Subject to any disclaimer, the term of this patent is extended or adjusted under 35 U.S.C. 154(b) by 0 days.

(21) Appl. No.: 10/123,813

(22) Filed: Apr. 16, 2002

(51) Int. Cl.⁷ .............................................. G01M 3/04
(52) U.S. Cl. ........................ 73/40.7; 73/49.2; 222/174
(58) Field of Search ................................. 73/40.7, 49.2, 73/104; 222/174

(56) References Cited

U.S. PATENT DOCUMENTS

| | | | |
|---|---|---|---|
| 1,289,505 A | * 12/1918 | Mariner | ...................... 222/164 |
| 4,566,313 A | * 1/1986 | Monten | ...................... 73/40.7 |
| 5,065,690 A | * 11/1991 | Bontempo | ................... 73/40.7 |
| 5,261,269 A | * 11/1993 | Barker | ......................... 73/40.7 |
| 5,734,096 A | * 3/1998 | McGuigan et al. | ........... 73/49.2 |

FOREIGN PATENT DOCUMENTS

JP          56039438 A  *  4/1981   ................. 73/40.7

\* cited by examiner

*Primary Examiner*—Edward Lefkowitz
*Assistant Examiner*—Michael Cygan
(74) *Attorney, Agent, or Firm*—J. Nenin Shafter, Jr.

(57) ABSTRACT

A leak detector apparatus and method includes, in containers holding large amounts of fluid, an extension. A support platform is connected to the extension and a compressible dye container with dye is connected to the support platform. A movable compression arm is connected to the support platform. A remote compression arm activator is connected to the compression arm. In another aspect of the invention, a compression brace is connected to the extension as well.

19 Claims, 2 Drawing Sheets

LEAK DETECTOR APPARATUS AND METHOD

FIELD OF THE INVENTION

This invention relates to a leak detector apparatus and method. In particular, the invention relates to a leak detector apparatus and method for use in containers holding large amounts of fluid wherein the leak detector apparatus and method is conformed for remote operation and use.

BACKGROUND OF THE INVENTION

A problem exists in the detection of leaks in containers designed to hold large amounts of fluids. By way of example only, and not by limitation, swimming pools provide a good example of the problems faced by those attempting to determine the source of leaks in these large fluid containers. Because of the quantity of fluid, water, involved, a serious leak may go undetected for days, months, or years. Leaks in the servicing equipment, such as filters, pumps, and so forth are generally easy to detect. However, leaks in the container, the pool, itself are often very difficult to detect. Significant leaks may result from hair line cracks essentially invisible to the naked eye.

Probably the most commonly used leak detector method involves the use of colored dye. In the prior art, with the pool full, a scuba diver swims about the bottom of the pool with a container of red dye and releases the dye in the areas that may appear to contain the source of the leak. To accomplish this prior art leak detection method requires the investment of considerable time and money. Literally hundreds if not thousands of dollars can be spent utilizing the services of these trained divers.

Thus, there is a need in the art for providing an apparatus and method for quickly, inexpensively, and easily determining the source of leaks in large containers of fluids.

SUMMARY OF THE INVENTION

Accordingly, the leak detector apparatus and method of the present invention includes, in containers holding large amounts of fluid, an extension. A support platform is connected to the extension. A compressible dye container with dye is connected to the support platform. A movable compression arm is connected to the support platform and a remote compression arm activator is connected to the compression arm.

In another aspect of the invention, a compression brace is connected to the extension. In another aspect of the invention, a container receiver is provided in the support platform. In a further aspect of this invention, the container receiver is a threaded female receiver conformed to receive a threaded male end of the compressible dye container.

In another aspect of the invention the movable compression arm is slidably connected to the support platform. In a further aspect of the invention, the movable compression arm is connected to the support platform by a hinge. In another aspect of the invention, the remote compression arm activator is a length of line with one end attached to the movable compression arm and one free end. In a further aspect of the invention, the length of line is selected from a group including wire, string and plastic. In another aspect of the invention, the compressible dye container is plastic and the dye is red.

In another embodiment of the invention, in swimming pools containing water, a leak detector apparatus includes an elongated handle. A support platform, with a cylinder receiver in the support platform, is attached to the handle. A compressible dye cylinder, with dye, is attached to the cylinder receiver. A movable compression arm is attached to the support platform. Finally, a length of line is provided with one end attached to the compression arm and one free end.

In another aspect of this invention, a compression brace is connected to the handle. In a further aspect of the invention, the cylinder receiver includes a threaded female receiver conformed to receive a threaded male end of the compressible dye cylinder. In another aspect of the invention, the movable compression arm is slidably attached to the support platform and, in another aspect, the compression arm is attached by a hinge.

In a further aspect of the invention, the length of line is selected from a group including metal wire, string and plastic. In a further aspect of the invention, the compressible dye cylinder is plastic and the dye is red.

In another embodiment of the invention, in swimming pools containing water, a leak detection method includes the steps of providing an elongated handle. A support platform is attached to the handle, the support platform including a threaded female receiver. A compressible dye cylinder, containing red dye, with a threaded male end is attached to the threaded female receiver in the support platform. A movable compression arm is attached to 1i the support platform. One end of a length of line is connected to the movable compression arm. The handle is used to place the compressible dye cylinder in the water next to a crack in the swimming pool. At this point, the user pulls the other end of the length of line thereby squirting red dye out of the dye cylinder in the area of the crack.

In another aspect of this invention, a compression brace is attached to the handle.

DESCRIPTION OF THE DRAWINGS

Other objects, features, and advantages of the present invention will become more fully apparent from the following detailed description of the preferred embodiment, the appended claims and the accompanying drawings in which:

DETAILED DESCRIPTION OF THE INVENTION

Figure 1:
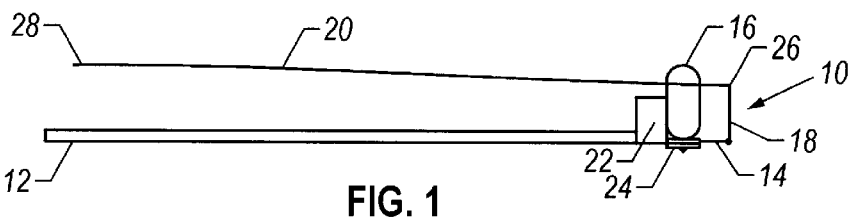
FIG. 1 is a side view of the leak detector apparatus of the present invention.

The preferred embodiment of the present invention is illustrated by way of example in FIGS. 1–6. With specific reference to FIG. 1, the leak detector apparatus 10 of the present invention includes extension 12. A support platform 14 is connected to extension 12. Compressible dye container 16 is connected to the support platform 14. Movable compression arm 18 is also connected to the support platform 14. A remote compression arm activator 20 is connected to the compression arm 18.

In another aspect of the invention, a compression brace 22 is connected to extension 12. Compression brace 22 provides both a back stop and support for compressible dye container 16. In a further aspect of the invention, support platform 14 includes container receiver 24 as will be more fully disclosed hereafter with reference to FIG. 5.

Extension 12 can be any handle device now known of or hereafter developed. A particularly useful form of extension 12 is a telescoping aluminum pole known in the art that easily adjusts in length as needed. Likewise support platform 14, movable compression arm 18 and compression brace 22 may be formed of any lightweight, rigid, material now known or hereafter developed including plastic, aluminum, and the like.

Additionally, compressible dye container 16, in a preferred embodiment, is made of resilient plastic. As illustrated, and in use, compressible dye container 16 functions much the same way as an ordinary cylinder shaped, plastic squeeze bottle, for example, again as will be disclosed more fully hereafter with reference to FIG. 5.

Remote compression arm activator 20 in a preferred embodiment is a length of line selected from a group including wire, string, and plastic. One end 26 is connected to movable compression arm 18 and one end 28 is free for manipulation.

Figure 2:
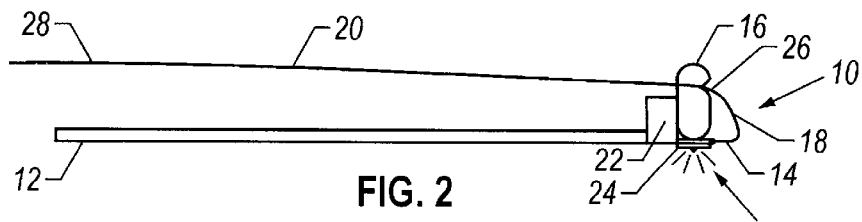
FIG. 2 is a side view of the invention of FIG. 1 illustrating the use of a movable compression arm to apply force to the compressible dye cylinder and thereby force dye from the cylinder.

Referring now to FIG. 2, the basic operation of the leak detector 10 of the present invention is described. Having assembled the above identified elements of leak detector 10, while holding extension 12 steady, a user pulls back on end 28 of remote compression arm activator 20 thereby pulling movable compression arm 18 in the direction of end 28. As shown in FIG. 2, movable compression arm 18, in this embodiment, is a bendable resilient plastic, for example, that readily bends. This bending causes compression arm 18 to apply compressive force to compressible dye container 16. As a result, dye 30 is forced from compressible dye container 16.

Figure 3:
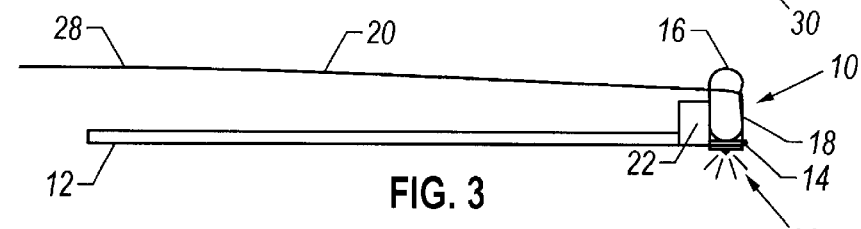
FIG. 3 is a side view of the invention of FIG. 1 illustrating the compression arm slidably connected to the extension.

Referring now to FIG. 3, another embodiment of the leak detector 10 of the present invention is illustrated wherein movable compression arm 18 does not bend. Instead, movable compression arm 18 includes a split base 32 connected to support platform 14 such that the entire split base 32 and upright movable compression 18 move together to apply compressive force to compressible dye container 16, as illustrated in more detail in FIG. 5.

Figure 4:
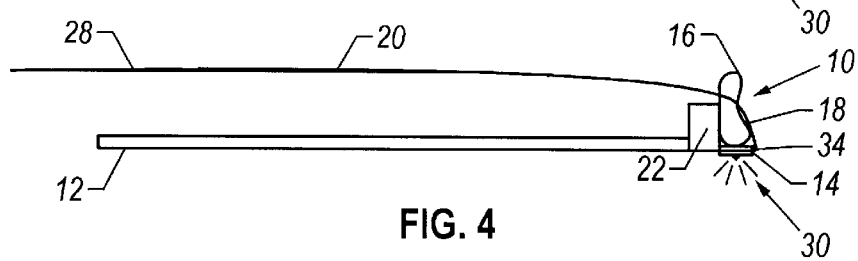
FIG. 4 is a side view of the invention of FIG. 1 illustrating the compression arm connected to the extension by means of a hinge.

Referring now to FIG. 4, another embodiment of the leak detector 10 of the present invention is illustrated wherein movable compression arm 18 is connected to platform 14 by means of a hinge 34. In this embodiment, pulling on the end 28 of remote compression arm activator 20 causes movable compression arm 18 to rotate in the direction of end 28 and thereby apply pressure to compressible dye container 16 such that dye 30 is squirted from compressible dye container 16.

Figure 5:
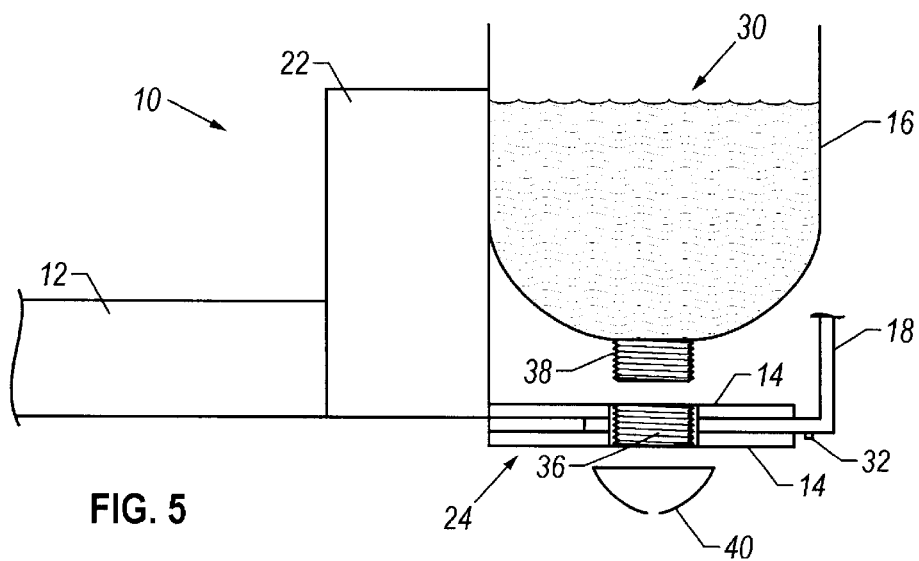
FIG. 5 is a side cut away partial view of the invention of FIG. 1 illustrating the container receiver and the threaded male end of the compressible dye container.

Referring now to FIG. 5, container receiver 24, along with other aspects of the invention, are more fully illustrated. In this embodiment, container receiver 24 includes a threaded female receiver 36. The threaded female receiver 36 is conformed to cooperate with corresponding threaded male end 38 of compressible dye container 16. The threaded male end 38 is screwed into the threaded female receiver 36 of support platform 14. Container receiver 24 in combination with compression brace 22 serve to support and retain compressible dye container 16 in position at the end of extension 12.

FIG. 5 also illustrates a preferred embodiment of the invention wherein nozzle end 40 is conformed to be screwed onto threaded male end 38 of compressible dye container 16, once male end 38 has been screwed into female receiver 36. Nozzle end 40, if needed, serves the purpose of ensuring that dye 30 does not escape from compressible dye container 16 unless and until movable compression arm 18 applies compressive force as described above. Typically, however, male end 38 of compressible dye container 16 is small enough such that when leak detector 10 is in operation the pressure of the fluid in the container to be tested is enough to prevent dye 30 from escaping unless and until compressive force is applied to container 16.

FIG. 5 also illustrates the embodiment disclosed in FIG. 3 above. In this embodiment, split base 32 is connected to support platform 14 and movable compression arm 18 is rigidly connected to split base 32. In this embodiment, when end 28 of remote compression arm activator 20 is pulled, split base 32 slides around threaded female receiver 36 such that the full length of movable compression arm 18 applies force along the length of compressible dye container 16.

Figure 6:
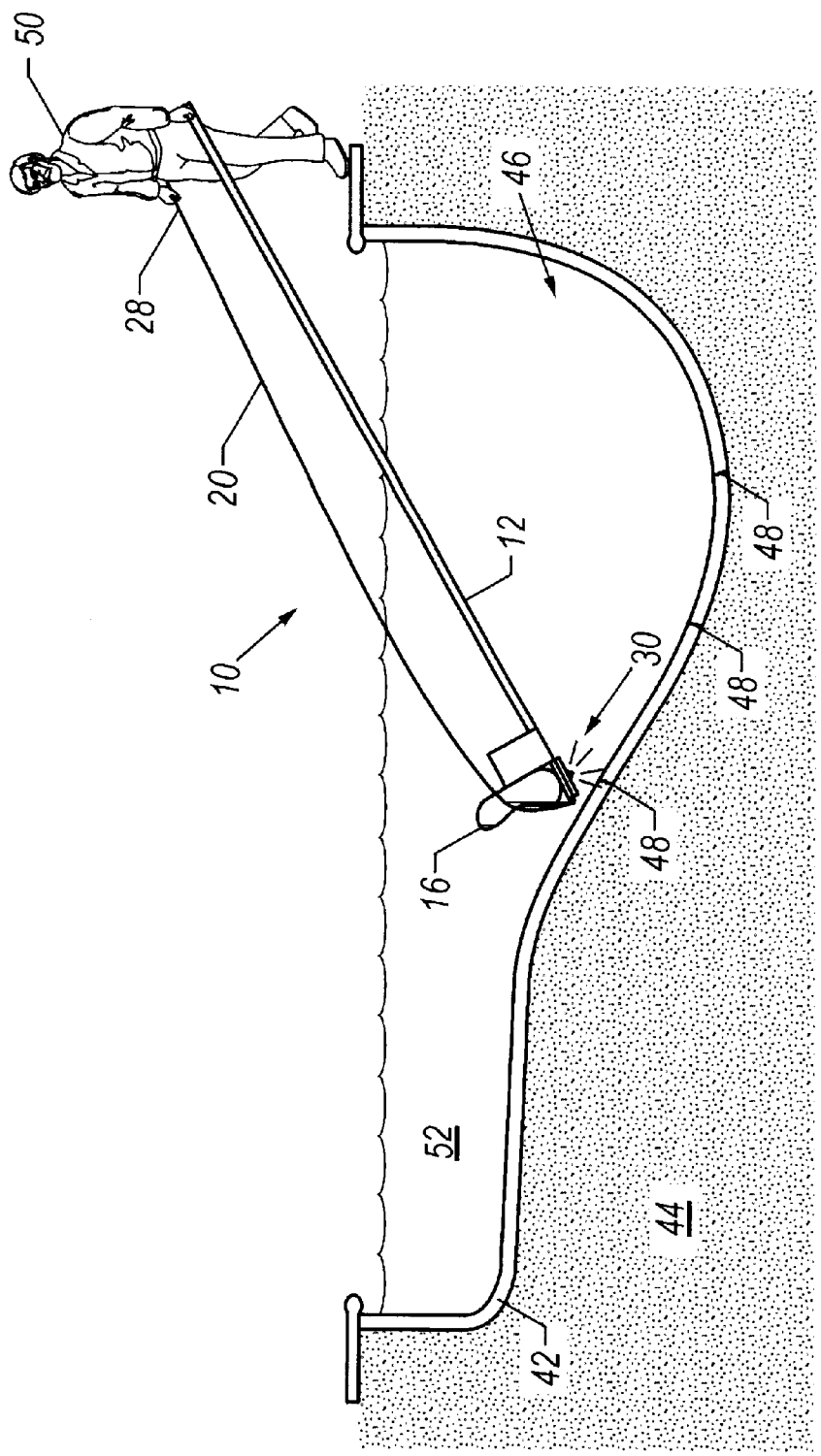
FIG. 6 is a side view of the invention of FIG. 1 illustrating the use of the invention in a swimming pool.

Referring now to FIG. 6, by way of further explanation, the use of leak detector 10 in the environment of a swimming pool 42 is, discussed. As illustrated, swimming pool 42 is located in ground 44. Deep end 46 includes several cracks 48. In use, a person 50 fills compressible dye container 16 with red dye 30. Obviously, dye 30 can be of any color, type or composition appropriate for the fluid container and fluid to be tested. Thereafter, compressible dye container 16 is connected to support platform 14 and extension 12 is utilized to place compressible dye container 16 in close proximity to the crack 48 to be tested. At that point, the person 50 pulls the end 28 of remote compression arm activator 20. As a result, movable compression arm 18 is moved, in one way or another as described above, so as to apply pressing force to compressible dye container 16. As the compressive force is applied to compressible dye container 16, dye 30 is forced out of container 16 and into the water 52. This process is repeated in swimming pool 42 around cracks 48 until the source of the leak is determined. A leak is recognized whenever the dye 30 flows from the water 52 into a crack 48.

The entire process, as just described, is easy, inexpensive, and efficient. It requires no rigorous scuba training and places the user in no hazard whatsoever.

The description of the present embodiments of the invention have been presented for purposes of illustration but are not intended to be exhaustive or to limit the invention to the form disclosed. Many modifications and variations will be apparent to those of ordinary skill in the art. As such, while the present invention has been disclosed in connection with the preferred embodiment thereof, it should be understood that there are other embodiments which fall within the spirit and scope of the invention as defined by the following claims.

What is claimed is:

1. In containers holding large amounts of fluid, a leak detector apparatus, the apparatus comprising:
   a) an extension;
   b) a support platform connected to said extension;
   c) a compressible dye container with dye connected to said support platform;

d) a movable compression arm connected to said support platform;

e) a remote compression arm activator connected to said compression arm; and f) a container receiver in said support platform wherein said container receiver is a threaded female receiver conformed to receive a threaded male end of said compressible dye container.

2. The apparatus of claim 1 further comprising a compression brace connected to said extension.

3. The apparatus of claim 1 wherein said movable compression arm is slidably connected to said support platform.

4. The apparatus of claim 1 wherein said movable compression arm is connected to said support platform by a hinge.

5. The apparatus of claim 1 wherein said remote compression arm activator is a length of line with one end attached to said movable compression arm and one free end.

6. The apparatus of claim 5 wherein said length of line is selected from a group including wire, string and plastic.

7. The apparatus of claim 1 wherein said compressible dye container is plastic.

8. The apparatus of claim 1 wherein said dye is red.

9. In swimming pools containing water, a leak detector apparatus, the apparatus comprising:

a) an elongated handle;

b) a support platform, with a cylinder receiver in the support platform, attached to the handle wherein the cylinder receiver is a threaded female receiver conformed to receive a threaded male end of the compressible dye cylinder;

c) a compressible dye cylinder, with dye, attached to the cylinder receiver;

d) a movable compression arm attached to the support platform; and e) a length of line with one end attached to the compression arm and one free end.

10. The apparatus of claim 9 further comprising a compression brace connected to the handle.

11. The apparatus of claim 9 wherein the movable compression arm is slidably attached to the support platform.

12. The apparatus of claim 9 wherein the movable compression arm is attached to the support platform by a hinge.

13. The apparatus of claim 9 wherein the length of line is selected from a group including metal wire, string and plastic.

14. The apparatus of claim 9 wherein the compressible dye cylinder is plastic.

15. The apparatus of claim 9 wherein the dye is red.

16. In swimming pools containing water, a leak detection method, the method comprising the steps of:

a) providing an elongated handle;

b) attaching a support platform to the handle, the support platform including a threaded female receiver;

c) attaching a compressible dye cylinder, containing red dye, with a threaded male end to the threaded female receiver in the support platform;

d) attaching a movable compression arm to the support platform;

e) attaching one end of a length of line to the movable compression arm;

f) using the handle to place the compressible dye cylinder in the water next to a crack in the swimming pool; and g) pulling the other end of the length of line thereby squirting red dye out of the compressible dye cylinder in the area of the crack.

17. The method of claim 16 further comprising the step of attaching a compression brace to the handle.

18. In containers holding large amounts of fluid, a leak detector apparatus, the apparatus comprising:

a) an extension;

b) a support platform connected to said extension;

c) a compressible dye container with dye connected to said support platform;

d) a movable compression arm connected to said support platform wherein said movable compression arm is slidably connected to said support platform; and e) a remote compression arm activator connected to said compression arm.

19. In containers holding large amounts of fluid, a leak detector apparatus, the apparatus comprising:

a) an extension;

b) a support platform connected to said extension;

c) a compressible dye container with dye connected to said support platform;

d) a movable compression arm connected to said support platform wherein said movable compression arm is connected to said support platform by a hinge; and e) a remote compression arm activator connected to said compression arm.

* * * * *